Dec. 22, 1953  W. E. MARTIN  2,663,574
TRAILER WITH DETACHABLE GOOSENECK
Original Filed Feb. 13, 1945  5 Sheets-Sheet 1
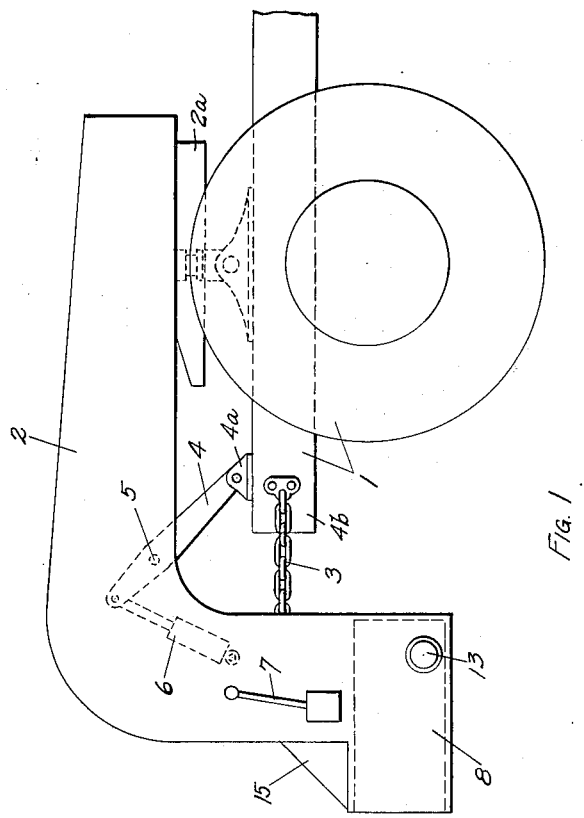
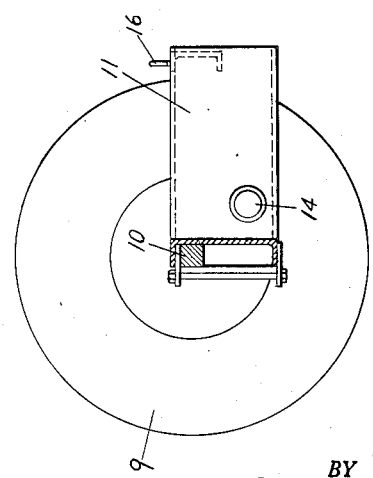
INVENTOR.
W. E. MARTIN
BY
Merrill M. Blackburn Dec. 22, 1953   W. E. MARTIN   2,663,574
TRAILER WITH DETACHABLE GOOSENECK
Original Filed Feb. 13, 1945   5 Sheets-Sheet 2
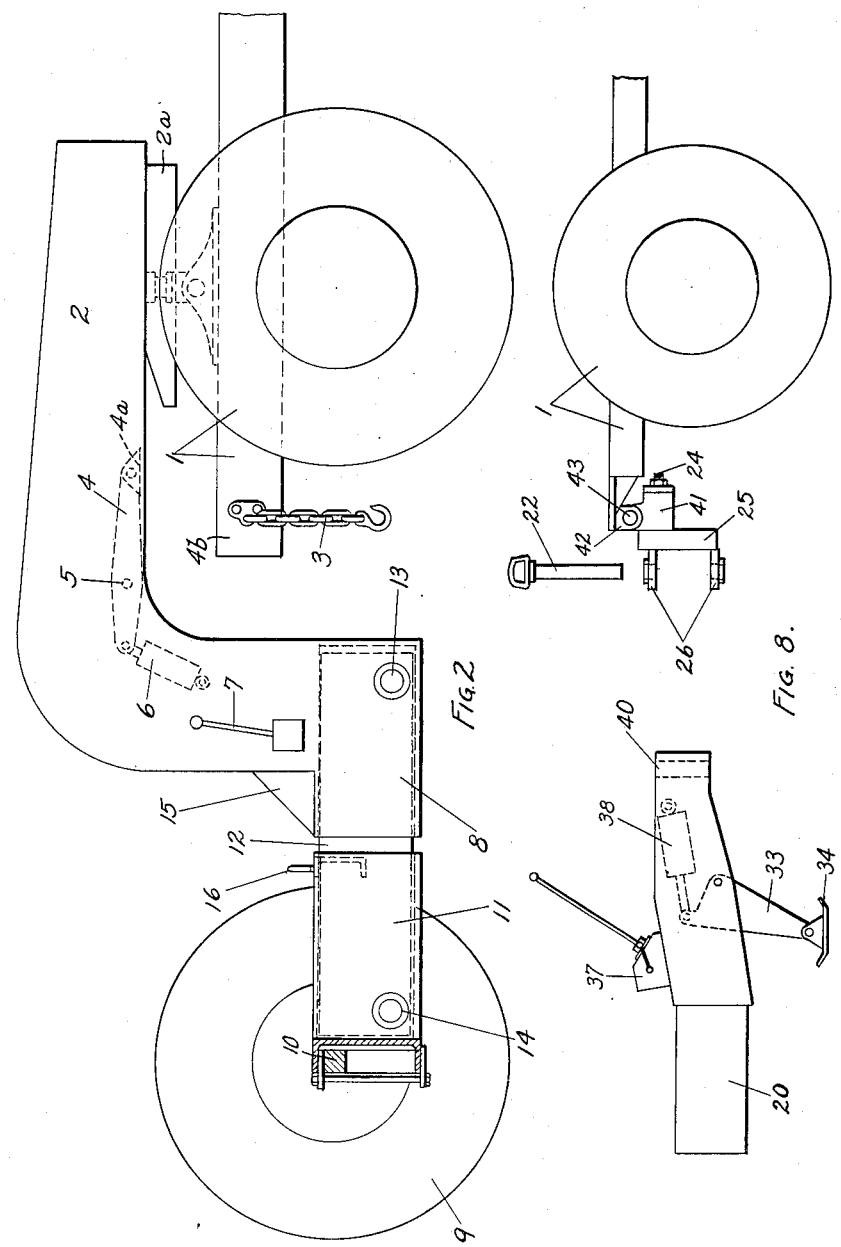
INVENTOR.
W. E. MARTIN
BY
Merrill M. Blackburn Dec. 22, 1953 W. E. MARTIN 2,663,574
TRAILER WITH DETACHABLE GOOSENECK
Original Filed Feb. 13, 1945 5 Sheets-Sheet 3
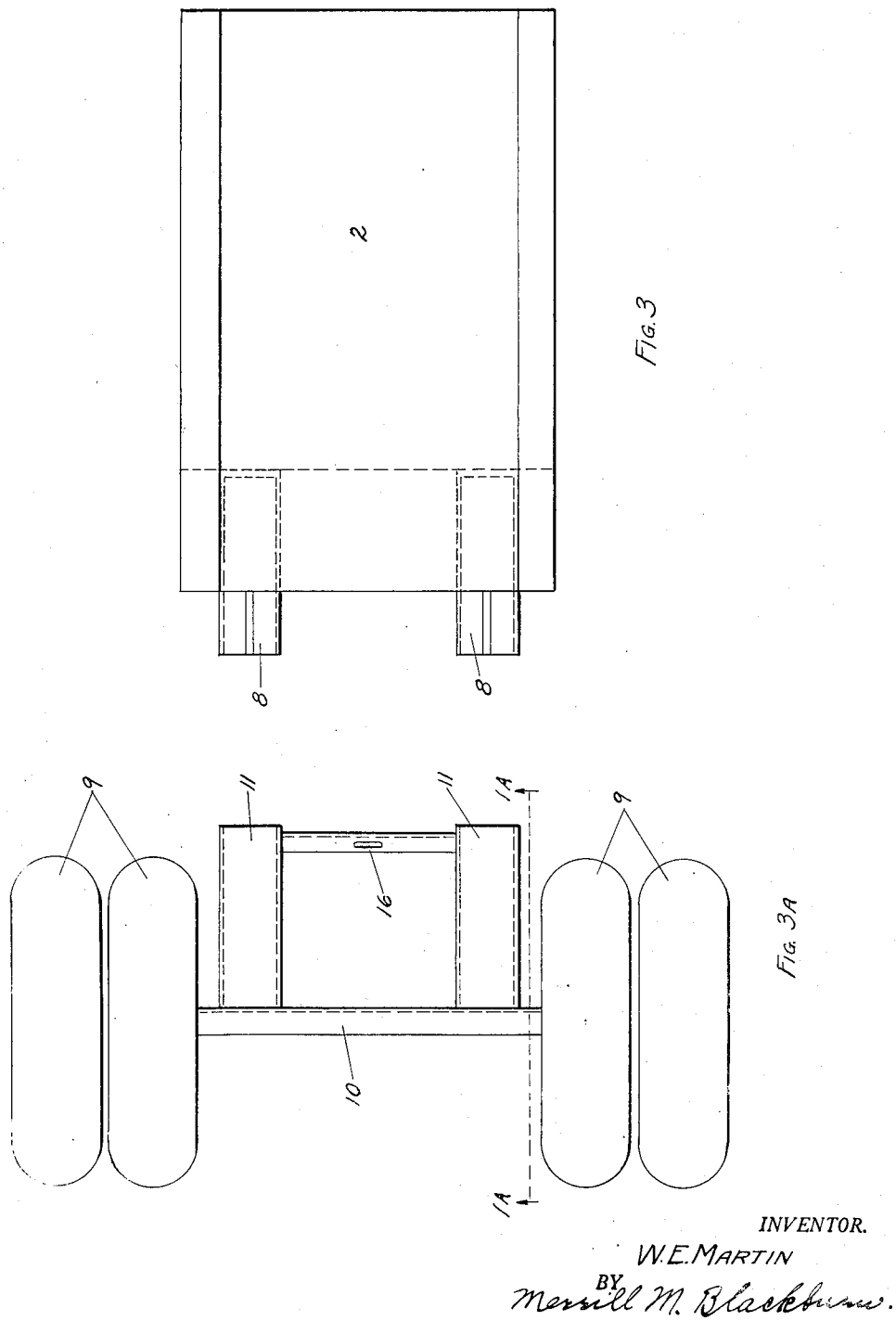
INVENTOR.
W.E. MARTIN
BY
Merrill M. Blackburn.

Dec. 22, 1953 W. E. MARTIN 2,663,574
TRAILER WITH DETACHABLE GOOSENECK
Original Filed Feb. 13, 1945 5 Sheets-Sheet 4
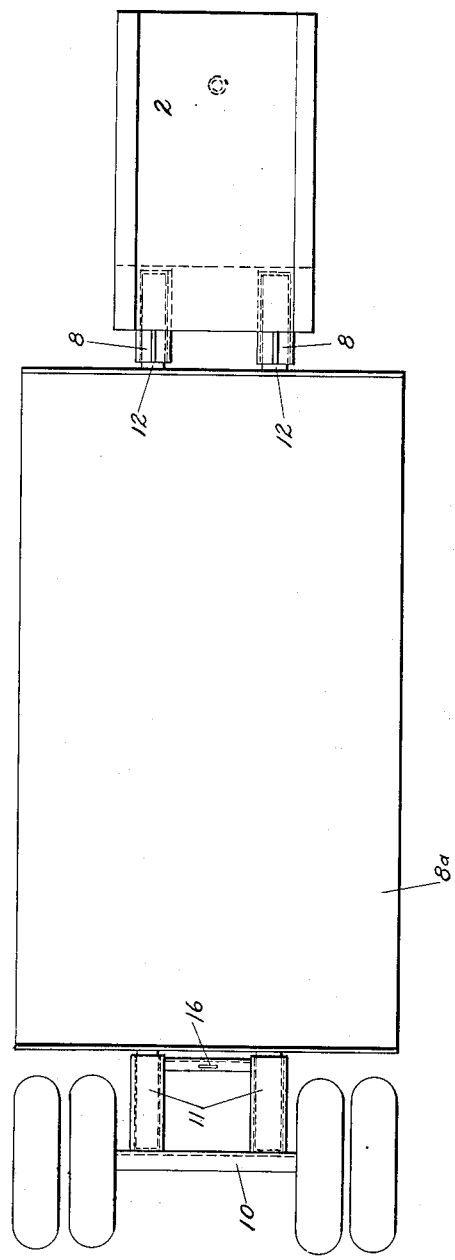
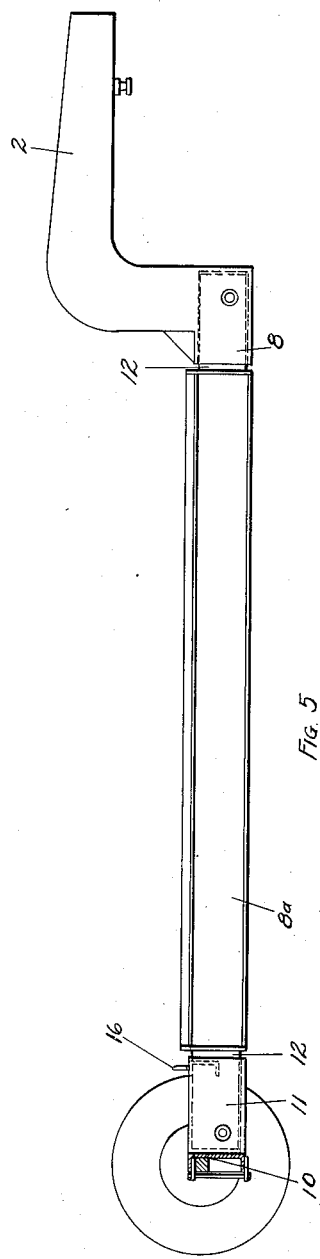
INVENTOR.
W. E. MARTIN
BY
Merrill M. Blackburn.

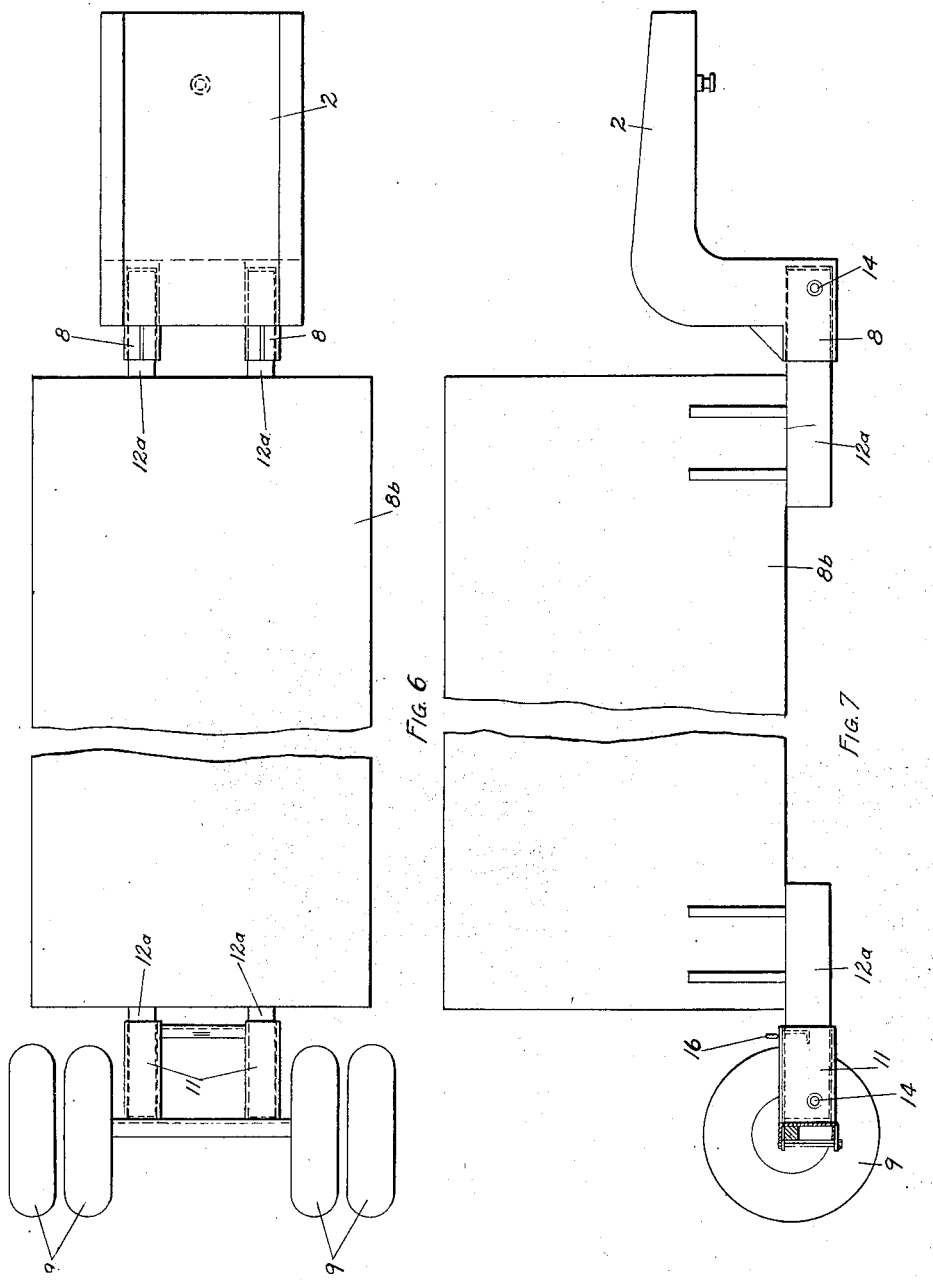

Patented Dec. 22, 1953

2,663,574

UNITED STATES PATENT OFFICE 2,663,574

TRAILER WITH DETACHABLE GOOSENECK

William E. Martin, Kewanee, Ill.

Substituted for abandoned application February 13, 1945, Serial No. 577,676. Divided and this application October 9, 1946, Serial No. 702,249

3 Claims. (Cl. 280—415)

My present invention relates to a trailer construction and more particularly to connectible and separable units which, when used in combination, form a trailer. Among the objects of this invention are to provide various connectible units which, when properly chosen and connected, will provide various forms of a convenient transporting unit; to provide structures which may be selected for the particular work to be done and combined to provide an effective structure for the purpose intended; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as several preferred embodiments of this invention, I desire the same to be understood as illustrative only and not to be interpreted in a limiting sense.

This application is a substitute for application 577,676 filed February 13, 1945, now abandoned.

In the drawings annexed hereto and forming a part hereof,

Fig. 1 represents a side elevation of the rear end of a traction unit and a gooseneck connected thereto;

Fig. 1A represents a cross-section of a rear supporting unit taken approximately along the plane indicated by the line IA—IA, Fig. 3A;

Fig. 2 represents the structures of Figs. 1 and 1A connected together by one type of connection;

Figs. 3 and 3A represent plan views of Figs. 1 and 1A;

Figs. 4 and 5 represent, respectively, plan and side elevation of the structure shown in Figs. 1 and 1A, connected by a different type of connecting unit;

Figs. 6 and 7 represent a still further modification of this structure, in which a tank unit is connected between the gooseneck and the rear carrying unit; and Fig. 8 represents, in elevation, still another form of connection of a traction unit to a drawn unit.

Reference will now be made in greater detail to the annexed drawings for a more complete description of this invention. A traction unit is indicated, in general, by the numeral 1 and is shown as being provided with a customary form of connection for receiving the coupling element of a gooseneck 2. Short sections 3 of chain, shown as attached to the traction unit and being connectible to and disconnectible from the gooseneck, serve as means for preventing the gooseneck from swinging sidewise and possibly causing damage when not connected to the rear supporting unit of the trailer. A lever 4 is pivotally connected to the gooseneck at 5 and may be turned about its pivot by the hoist 6, controlled by the handle 7 and a foot 4a is carried by a free end of lever 4 for engagement with a portion of the frame 4b of the tractor 1. One or more units of this kind can be employed with each having a foot 4a and the connected lever 4 that act in the positions shown in Fig. 1 through the hydraulic hoist 6 to support the overhanging gooseneck 2 in a given relation to the tractor frame 4b. Thus, gooseneck 2 is removably carried upon the tractor by the fifth wheel 2a and by one or more feet 4a, and side chains 3 are used as lateral stabilizers to hold the gooseneck 2 in longitudinal alignment with the tractor chassis.

At the rear lower corners of the gooseneck are sockets which serve as connecting means whereby the gooseneck may be connected to another unit, either the wheeled unit of Figs. 1A and 3A, the intermediate unit of Figs. 2, 3, 4, 5, 6, and 7, or some other comparable unit.

The rear supporting unit of the trailer comprises wheels 9 of desired number, two or four, an axle 10 and connecting means 11. The means 8 and 11 may be united by a suitable device 12 which may be either tubular or solid but I prefer to make it tubular and of a size to slip easily into the parts 8 and 11 but not so small as to have an undesirable amount of play therein. Suitable securing means such as pins or cross rods 13 and 14 serve to hold the joined parts releasably secured together. A gusset 15 serves to strengthen the joint between the main part of the gooseneck 2 and the connecting means 8. The handle 16 serves as means whereby the rear connecting unit may be lifted when it is desired to connect this part of the trailer to the forward part comprising the gooseneck 2. Obviously, gooseneck 2 can be held or adjusted by members 4, 4a, 5 and 6 to meet the connecting structures described immediately above. When the gooseneck and wheeled units are connected as in Fig. 2, the hoist 6 can then swing lever 4 into the position here illustrated. Chains 3 are then removed and the trailing vehicle is rendered transportable through gooseneck 2 and fifth wheel 2a as in any other form of trailing vehicle.

If therefore it is desired to transport the trailer from one location to another without utilizing it as a transporting medium, it may be connected up as shown in Fig. 2. On the other hand, if it is desired to have a platform on which to load and transport heavy articles, the platform 8a may be connected to the connectors 8 by a pair of units 12, as shown in Fig. 5, and to the connectors 11 by similar units. It will be readily appreciated that this unit, set up as shown in Figs. 4 and 5, can be readily connected to a traction unit, as shown in Figs. 1 and 2, and will serve as a convenient means for transporting loads.

Figs. 6 and 7 show my invention used in the transportation of a large tank 8b which has four units 12a secured thereto in such relationship that they may be inserted into the connectors 8 and 11 for typical gooseneck transportation made feasible by using the detachable gooseneck as illustrated in Figs. 1 and 2.

The modified construction illustrated in Fig. 8 represents a further variation and adaptation of the invention over the forms thereof shown in Figs. 2, 5 and 7. The forward end of a trailer can be arranged for attachment with the connector or reach 20 which replaces the gooseneck structures 2 in Figs. 2, 5 and 7 and which connector 20 connects with the traction unit 1 which is more specifically revised to receive connector 20.

In the Fig. 8 construction, the connector or reach 20 is provided with one or more legs 33 having ground engaging feet 34. A hoist unit such as the hydraulic cylinder 38 is link connected with leg 33 to actuate the leg about its pivotal mounting on the connector unit as brought about through the manipulation of a fluid pump such as 37 carried upon the connector 20 and operably connected with cylinder 38.

The forward connector unit 20 of the trailer is provided with a vertically arranged eye 40 for attachment with the tractor or towing unit 1. The tractor in this instance is constructed and arranged to accommodate unit 20 and provides a body or bracket 25 having a spindle 24 projecting therefrom. The body or bracket 25 is also provided with ears 26 for connection to the eye 40 by means of a pin 22. The spindle 24 is surrounded by a sleeve 41 which has an apertured lug projecting upwardly therefrom for reception between a pair of ears 42. The lug and ears are connected by a pivot pin 43 which allows vertical pivoting action between the traction unit and the trailer unit.

Thus connector 20 is vertically adjustable by leg contact with the ground and the traction unit is arranged for convenient reception of this particular type of connector that is attached to a trailing vehicle.

While I have disclosed various uses for this invention, I wish it understood that this disclosure is illustrative only and is not to be interpreted in a limiting sense. Other embodiments of this invention than shown herein are possible within the scope of the annexed claims and it is my intention that they shall be included within these claims.

Having now described my invention, I claim:

1. In a transporting mechanism, including an axle-supported truck platform carrying a part of a pivotal support for a trailer gooseneck; a gooseneck pivotally connected thereto, a wheel-supported trailer axle, said trailer axle having forwardly extending sockets, said gooseneck having rearwardly extending sockets, and connecting means to fixedly join said gooseneck and trailer axle comprising rigid members insertable into the respective sockets of said gooseneck and said trailer axle.

2. In a transporting mechanism, including an axle-supported truck platform carrying a part of a pivotal support for a trailer gooseneck; a gooseneck pivotally connected thereto, a wheel-supported trailer axle, said trailer axle having forwardly extending sockets, said gooseneck having rearwardly extending sockets, connecting means insertable into said two sets of sockets to rigidly join said gooseneck and said trailer axle, and stabilizing means arranged for connection with the sides of the truck platform and with side portions of the gooseneck to control lateral movements of the gooseneck while assembling the trailer parts.

3. A detachable gooseneck for trailers comprising a forward section, a king pin on said section for connection with the fifth wheel of a tractor to support said section for lateral and vertical swinging movement, and adjustable lift means mounted upon a rearward section of said gooseneck to frictionally engage a portion of the tractor spaced from said fifth wheel to bodily support the gooseneck in a given relation upon said tractor, said lift means comprising a swingable arm connected with said gooseneck, a foot at the free end of said arm to engage the tractor, and power means to actuate another portion of said arm and the foot to raise or lower said gooseneck with respect to said tractor and about the fifth wheel.

WILLIAM E. MARTIN.

References Cited in the file of this patent

UNITED STATES PATENTS

| Number | Name | Date |
| --- | --- | --- |
| 1,391,962 | Mangel | Sept. 27, 1927 |
| 2,062,053 | Horsey | Nov. 24, 1936 |
| 2,091,009 | Osman | Aug. 24, 1937 |
| 2,131,949 | Helmig | Oct. 4, 1938 |
| 2,223,375 | Le Tourneau | Dec. 3, 1940 |
| 2,256,594 | Ingram | Sept. 23, 1941 |
| 2,266,913 | Simmons | Dec. 23, 1941 |
| 2,312,769 | Mosling | Mar. 2, 1943 |
| 2,325,869 | Mosling | Aug. 3, 1943 |
| 2,350,841 | Troche et al. | June 6, 1944 |
| 2,377,315 | Beitzel | June 5, 1945 |
| 2,383,666 | Martin | Aug. 28, 1945 |